Nov. 7, 1939.   R. CHILTON ET AL   2,179,072
PLANETARY REDUCTION GEAR
Filed Nov. 3, 1937
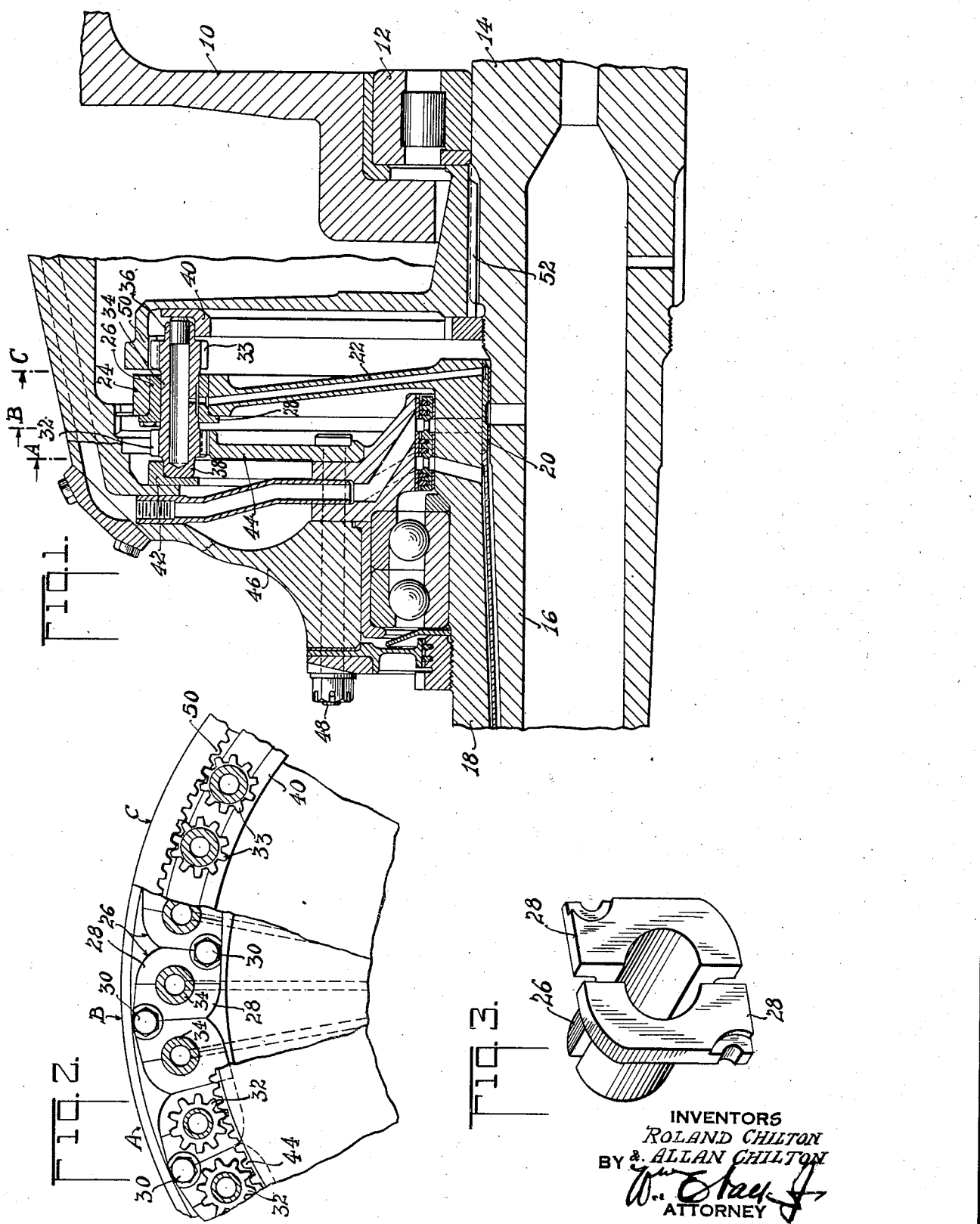
INVENTORS
ROLAND CHILTON
BY & ALLAN CHILTON
ATTORNEY Patented Nov. 7, 1939

2,179,072

UNITED STATES PATENT OFFICE 2,179,072

PLANETARY REDUCTION GEAR

Roland Chilton and Allan Chilton, Ridgewood, N. J., assignors, by mesne assignments, to Wright Aeronautical Corporation, Paterson, N. J., a corporation of New York Application November 3, 1937, Serial No. 172,561

10 Claims. (Cl. 74—305)

This invention relates to planetary reduction gears, the showings representing a design suitable for large aircraft engines.

The invention comprises novel means whereby an extraordinarily large number of relatively small pitch diameter planet pinions may be utilized. It will be appreciated that, within any given ring gear, the driving capacity is proportional to the number of pinions used. The drawing illustrates the use of 36 pinions, this being possible by the novel organization of the planet pinions and their carrier which permits extremely close pinion spacing, and, at the same time, gives adequate rigidity and proper provisions for the maintenance of the tooth alignment.

Other objects of the invention will be obvious from, or will be pointed out, in the following description with reference to the drawing in which, Fig. 1 is a fragmentary longitudinal section through a gear embodying the invention;

Fig. 2 comprises fragmentary sections on the lines A, B and C of Fig. 1; and

Fig. 3 is a perspective detail of a split bushing.

In the drawing 10 designates a portion of an engine crankcase, having the usual main bearing 12 in which is carried a conventional crankshaft 14 having an extension 16, carrying a tubular propeller shaft 18 by means of conventional bushings, one of which is shown as 20. Integral with the tubular shaft 18 is a back plate 22, having a rim 24 provided with circumferentially spaced bores in which are fitted split pinion bushings 26, seen in enlarged detail in Fig. 5 comprising two halves having flanges 28, each flange abutting the flange of the adjacent bushing for securement by a common screw 30. Supported in these bushings are planet members comprising spaced pinions 32, 33 having therebetween an integral journal portion 34, engaging the bushings 26 so that the pinions 32, 33 extend on either side of the carrier rim 24. It will be seen that the thickness of the bushings 26 exceeds the height of the pinion teeth 32, whereby the pinions may be assembled through the holes in the rim 24 in which the bushings are seated. The pinions also have extended cylindrical stubs 36 and 38, the former rollably engaging an internal floating ring 40, and the latter rollably engaging an external floating ring 42. Engaged with the pinions 32, 33 on either side of the carrier 22—24 are respectively a sun gear 44 secured to a gear housing 46 as by bolts 48, and a ring gear 50, splined to the crankshaft 14 at 52 as shown. The gear housing 46 is rigid with the crankcase 10.

It will be seen that ring gear 50 and the sun gear 44 engage the planet pinion members at diagonally opposed points on either side of the pinion journals 34. The tangential driving effort on the teeth is therefore balanced about the center of the journal bearing so that the assembly is in balance with respect to the main driving forces which are normal to the plane of Fig. 1. However, due to the pressure angle of the teeth, there are components from the ring gear 50 acting to displace the companion pinion radially inward, and from the sun gear 34 tending to displace that end radially outward. These reactions would produce tipping of the journal 34 in the bushings 26 but for the floating rings 40 and 42 which take these reactions by free rolling contact against the extended stubs 36—38 of the integral pinion units.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a planet gear having concentric ring and sun gears axially spaced, a planet carrier having a rim disposed in such space, a planet member comprising a journal between and integral with two pinion elements of diameter larger than the journal engaging the respective gears, a split bushing comprising a bearing for said journal and engaged in a bore in said rim, said bore and bushing being of greater diameter than the smallest pinion to allow of assembly of the planet member and means for securing said bushing halves in said rim.

2. In a planetary reduction gear in combination, a ring gear and a concentric sun gear axially spaced, a member having pinion elements engaging the respective gears and a journal element of smaller-than-pinion diameter integrally connecting said pinion elements, a split bushing externally of greater-than-pinion diameter engaging said journal, a planet carrier having bores within which said bushings are engaged, and means for securing said bushings in said carrier.

3. A planetary gear including in combination, a planet carrier, planet members each comprising a shaft extending through said carrier and having pinions on either side thereof, floating rings rollably contacting the extending ends of said shafts and a ring gear and a sun gear engaging the respective pinions.

4. A planetary gear including ring and sun gears axially spaced, a planet carrier therebetween, pinion members each comprising a central shaft borne in said carrier and pinions on either side of the carrier respectively engaging the ring and sun gears, said member including cylindrical projections beyond the pinions, a floating ring embracing the projections on the sun gear side of said carrier, and a floating ring in contact with and embraced by the projections on the ring gear side of said carrier.

5. In a planetary gear; a carrier having a plurality of circumferentially spaced bearings; planet elements having shafts engaged in said bearings, and pinion and shaft elements cantilevered beyond said carrier; a gear concentric with the carrier engaging said pinions producing radial forces thereon in operation, and a floating ring rollably engaging said shaft elements in opposition to said radial forces.

6. In a planetary gear, a carrier having bearings, a shaft in each bearing extending axially beyond the carrier, each said shaft having a pinion on each side of said carrier, gear means engaging respective sets of pinions producing respectively, radially inward and radially outward forces tending to tilt said shafts, and a floating ring in rolling contact with said shafts, outboard of said pinions, resisting said tilt.

7. In a planetary gear, a carrier having a plurality of cantilevered pinions borne thereby, a cylindrical extension on that side of each pinion opposite from the carrier, a gear engaging said pinions, and a ring rollably contacting the extensions on the sides of the pinion axes opposite from the gear-pinion engagements.

8. In a planetary gear, a carrier having a plurality of circumferentially spaced bearings; planet elements each including a shaft engaging a bearing, an integral pinion on one side of the carrier and a cylindrical extension beyond the pinion; a gear engaging the several pinions, and a ring rollably engaging the several extensions to offset the radial deformation of the planet elements caused by the pinion-gear engagements.

9. In a planetary gear, a planet carrier, a plurality of planet elements each comprising a shaft and integral pinions of greater-than-shaft diameter at each end of the shaft, pairs of bearing halves engaged around respective planet element shafts and means common to adjacent halves of consecutive bearing pairs for securing said bearing halves with their assembled planet elements upon the carrier.

10. In a planetary gear, a planet carrier, a plurality of planet elements each comprising a shaft and integral pinions of greater-than-shaft diameter at each end of the shaft, pairs of bearing halves engaged around respective planet element shafts, means for securing said bearing halves with their assembled planet elements upon the carrier, extensions on the ends of each pinion remote from the carrier, and rings rollably engaging the pluralities of pinion extensions.

ROLAND CHILTON.
ALLAN CHILTON.